(12) United States Patent
Kody et al.

(10) Patent No.: US 6,977,113 B2
(45) Date of Patent: *Dec. 20, 2005

(54) MICROFIBER ARTICLES FROM MULTI-LAYER SUBSTRATES

(75) Inventors: Robert S. Kody, Minneapolis, MN (US); Mario A. Perez, Burnsville, MN (US); John W. Longabach, White Bear Lake, MN (US); Kimberley D. Klepzig, Saint Paul, MN (US); John M. Sebastian, Maplewood, MN (US); Terry R. Hobbs, Saint Paul, MN (US); Matthew J. Michel, Saint Paul, MN (US); Timothy J. Lindquist, Saint Paul, MN (US); Ravi K. Sura, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 324 days.

This patent is subject to a terminal disclaimer.

(21) Appl. No.: 09/974,040

(22) Filed: Oct. 9, 2001

(65) Prior Publication Data

US 2003/0068481 A1 Apr. 10, 2003

(51) Int. Cl.⁷ .......................... D04H 1/00; B32B 27/04
(52) U.S. Cl. .................... 428/292.1; 428/297.4
(58) Field of Search ................. 428/359, 292.1, 428/311.11, 373, 374, 141, 212, 220, 297.4

(56) References Cited

U.S. PATENT DOCUMENTS

| | | | |
|---|---|---|---|
| 3,003,304 A | 10/1961 | Rasmussen | 57/157 |
| 3,496,260 A | 2/1970 | Guenther et al. | 264/156 |
| 3,695,025 A * | 10/1972 | Gibbon | 57/140 |
| 4,041,203 A | 8/1977 | Brock et al. | |
| 4,100,324 A * | 7/1978 | Anderson et al. | 428/288 |
| 4,374,888 A * | 2/1983 | Bornslaeger | 428/198 |
| 4,618,524 A * | 10/1986 | Groitzsch et al. | 428/198 |
| 4,973,517 A * | 11/1990 | Lammers et al. | 428/354 |
| 5,085,920 A * | 2/1992 | Nohr et al. | 428/198 |
| 5,354,603 A * | 10/1994 | Errede et al. | 428/240 |
| 5,451,283 A | 9/1995 | Josephy et al. | |
| 5,639,541 A | 6/1997 | Adam | |
| 5,706,804 A * | 1/1998 | Baumann et al. | 128/206.19 |
| 5,855,992 A | 1/1999 | Etzold | |
| 5,939,339 A | 8/1999 | Delmore et al. | |
| 6,110,588 A | 8/2000 | Perez et al. | 428/359 |
| 6,124,971 A | 9/2000 | Ouderkirk et al. | |
| 6,331,343 B1 * | 12/2001 | Perez et al. | 428/141 |

(Continued)

FOREIGN PATENT DOCUMENTS

EP 0 366 210 A2 5/1990

(Continued)

OTHER PUBLICATIONS

U.S. Appl. No. 09/602,978, filed Jun. 23, 2000, "Fibrillated Article and Method of Making".

(Continued)

*Primary Examiner*—Rena Dye
*Assistant Examiner*—Camie Thompson
(74) *Attorney, Agent, or Firm*—Kent S. Kokko

(57) ABSTRACT

Microfiber articles and methods and intermediates for their production, the microfiber articles being preferably produced from co-extruded multi-layer films, and the articles having a multi-layer construction that allows selection of the different layers to have different properties.

31 Claims, 2 Drawing Sheets

U.S. PATENT DOCUMENTS

| | | | |
|---|---|---|---|
| 6,368,687 B1 * | 4/2002 | Joseph et al. | 428/40.1 |
| 6,420,024 B1 * | 7/2002 | Perez et al. | 428/359 |
| 6,582,810 B2 * | 6/2003 | Heffelfinger | 428/297.4 |
| 6,680,114 B2 * | 1/2004 | Kody et al. | 428/359 |

FOREIGN PATENT DOCUMENTS

| | | |
|---|---|---|
| EP | 1 091 042 A1 | 4/2001 |
| GB | 1 244 860 | 9/1971 |
| WO | WO 99/43881 A1 | 9/1999 |
| WO | WO 99/61520 | 12/1999 |
| WO | WO 00/68301 A1 | 11/2000 |
| WO | WO 02/092899 A1 | 11/2002 |

OTHER PUBLICATIONS

U.S. Appl. No. 09/746,355, filed Dec. 21, 2000, "Charged Microfibers, Microfibrillated Articles and Use Thereof".

U.S. Appl. No. 09/858,253, filed May 15, 2001, "Fibrous Films and Articles From Microlayer Substrates".

U.S. Appl. No. 09/858,273, filed May 15, 2001, "Microfiber-Entangled Products and Related Methods".

U.S. Appl. No. 10/027,713, filed Dec. 19, 2001, "Microfibrillated Articles Comprising Hydrophilic Component".

* cited by examiner

MICROFIBER ARTICLES FROM MULTI-LAYER SUBSTRATES

FIELD OF THE INVENTION

The invention relates to multi-layer films that bear a microfiber surface, films and methods used to prepare them, and articles made from them.

BACKGROUND

Polymeric materials that can be processed to form microfiber surfaces and microfiber articles have been identified, including mono-axially oriented films such as polypropylene. See U.S. Pat. No. 6,110,588. Such polymeric materials can be selected and processed using various techniques, to produce oriented films capable of being microfibrillated to a microfiber surface.

Multi-layer films are generally known, and include a huge variety of different combinations of layer composition, sizes, and methods of preparing the different layers into a multi-layer film, e.g., lamination, co-extrusion, the use of adhesives, etc.

Until now, there has been little if any recognition of the potential benefits and synergies that can be achieved using multi-layer films, particularly co-extruded multi-layer films, to form microfibers, microfiber surfaces, and microfiber articles.

SUMMARY OF THE INVENTION

The invention identifies multi-layer films that bear very fine fibers, e.g., microfibers, and methods of preparing them from multi-layer film precursors, preferably co-extruded multi-layer film precursors.

Advantageously, the different layers of the multi-layer film can be selected based on the independent properties of the different layers to produce a multi-layer microfiber article having a combination of desired properties. For example, different layers of a multi-layer film can be independently selected to provide one or more layers that are hydrophobic; hydrophilic; oleophobic; oleophilic; dielectric; to exhibit certain physical properties such as rigidity, flexibility, high or low elasticity, high or low strength, tear or puncture resistance, stain resistance, breathability, and being waterproof; to give a desired frictional property such as a high or low coefficient of friction; to provide a desired color or color combination; to provide a desired size of fibers, fibrils, or microfibers, or a desired surface area of a fiber or microfiber surface; to provide high or low temperature resistance or flame retardance; or a combination thereof.

As a particular example, one layer can be selected to give a hydrophilic surface, while another layer has an oleophilic surface. Using a multi-layer film to produce a microfiber film or fibrillated article, for example, can allow the production of various multi-surface articles such as pads, drapes, cloth-like wipes, microfiber mats, and a large variety of others, which contain layers of two or more different types of materials. This could be useful to make a wipe that is both water and oil absorbing, by starting from a film with layers of polypropylene and a hydrophilic polymer.

In a different embodiment, layers can be selected to include one or more microfiber-forming layers and one or more layers that are not microfiber-forming layers, preferably to give a combination of properties from the different layers. The non-microfiber-forming layer can be selected to give a certain physical or chemical property such as hydrophobicity, hydrophilicity, etc.; stain or water resistance; or a mechanical property such as rigidity, flexibility, tear or puncture resistance, breathability, strength, and elasticity. As an example, a multi-layer film can have a non-microfiber-forming inner layer of a plastic, a fluoropolymer, a hard yet flexible rubber or soft rubber, or an elastomer, and surface layers of a microfiber-forming polymer such as polypropylene. The microfiber article may exhibit a combination of properties including properties of a waterproof elastomer and a microfiber surface, to give a microfiber article having combined properties of a flexible or stretchable microfiber-surface-bearing cloth.

In certain embodiments, the invention takes advantage of the understanding that films having multiple different layers with independently selected properties can be efficiently co-extruded to form a multi-layer film, which can then be microfibrillated to produce a microfiber article having a desired combination of properties based on the composition and properties of the different layers of the co-extruded film. The preparation of a multi-layer film by co-extruding can realize processing advantages because co-extruding different layers into a single film can be more efficient and economical than other possible (and still useful) methods of producing a multi-layer film, such as by separate production of individual layers and lamination or adhesion of those layers to one another.

According to preferred embodiments of the invention, oriented, multi-layer polymeric films can be transformed into microfiber mats, wipes, or other types of cloth-like materials using standard methods of microfibrillation, including hydroentanglement techniques using a hydroentangling machine. One or more layers of a multi-layer film, and different amounts or thicknesses of the one or more layers, may be microfibrillated to form microfibers.

An aspect of the invention relates to a multi-layer film comprising microfibers. The preferred films can be oriented to facilitate formation of microfibers. Preferred films can also include layers of different materials selected to provide a desired combination of properties in the film.

Another aspect of the invention relates to a microfiber article including one or more microfiber layers and a non-microfiber layer comprising a material selected from the group consisting of a polypropylene, a polyethylene, a styrene-ethylene/butylene-styrene block copolymer, a styrene-isoprene-styrene block copolymer, a polyurethane, and a fluoropolymer.

Another aspect of the invention relates to a co-extruded, oriented multi-layer film comprising one or more microfiber-forming layers.

Another aspect of the invention relates to a two-layer co-extruded film comprising one or two microfiber-forming layers.

Another aspect of the invention relates to a three-layer co-extruded film comprising two microfiber-forming layers sandwiching a non-microfiber core layer.

Another aspect of the invention relates to a multi-layer microfiber article that includes a first microfiber layer at a surface of the article, and second microfiber layer adjacent to the first microfiber-layer. Areas of the article surface are microfibrillated to form microfibers of only the first layer, and areas of the surface are microfibrillated through the first layer to form microfibers of the second layer.

Another aspect of the invention relates to a method of producing a microfiber-forming multi-layer film. The method includes providing an oriented polymeric film, casting a polymeric film onto the oriented film to produce a multi-layer film, and orienting the multi-layer film to produce a multi-layer film having one or more layers that can be microfibrillated to produce microfibers.

Another aspect of the invention relates to a method of producing a microfiber article. The method comprises providing a multi-layer film comprising at least one microfiber-forming layer, and microfibrillating the microfiber-forming layer to form microfibers.

Still another aspect of the invention relates to a method of producing a microfibrillated article. The method comprises co-extruding a multi-layer film having at least two layers, orienting the film to produce a microfiber-forming layer that can be microfibrillated to produce microfibers, and microfibrillating the microfiber-forming layer to form microfibers from the layer.

Yet another aspect of the invention relates to a method of producing a microfibrillated article. The method includes providing an oriented film, casting a polymeric film onto the oriented film to produce a multi-layer film, orienting the multi-layer film to produce a multi-layer film having one or more layers that can be microfibrillated to produce microfibers, and fibrillating the layer to form microfibers.

Figure 1:
FIG. 1 illustrates a cross-section of an embodiment of a multi-layer film of the invention having two layers.

All drawings are not drawn to scale.

DETAILED DESCRIPTION

The invention relates to multi-layer films that include at least one layer that can be microfibrillated to form microfibers on a microfiber surface, i.e., a "microfiber-forming layer." The multi-layer film will also include one or more additional layers, any of which can be a microfiber-forming layer or a non-microfiber-forming layer, or another fiber-forming layer, etc. The terms "non-microfiber layer" and "non-microfiber-forming layer" refer to a layer that is not capable of being microfibrillated to produce microfibers, and that does not contain microfibers. The term "microfiber layer" refers to a layer that comprises microfibers, e.g., due to the layer being a microfibrillated microfiber-forming layer. The multi-layer films can be processed by microfibrillating at least one microfiber-forming layer to produce a "microfiber article," which as used herein is a multi-layer article having at least one microfiber layer. (Generally herein, the terms "microfiber-forming layer" and "microfiber layer" refer to the same layer of a multi-layer film, the only difference being that the microfiber layer is a microfiber-forming layer that has been microfibrillated. Thus, other than this difference, those two terms can normally be interchangeable.)

The use of multi-layer films to prepare microfiber articles allows preparation of microfiber articles that exhibit a combination of two or more desired properties (e.g., chemical, mechanical, physical, or aesthetic properties, etc.) in a single article, based on the properties of the chosen layers. Almost any variety of different chemical, mechanical, physical, or aesthetic properties can be independently provided in a multi-layer film, depending on the choice of materials for the different layers. Examples of different properties include: attractive or repulsive properties with respect to different chemical materials such water and oil, e.g., by using materials or layers that are hydrophobic, hydrophilic, oleophobic, oleophilic, etc., including the properties of being "water-resistant" or "water-proof"; electrically conductive or insulative properties such as a dielectric layer or an electrically conductive layer, or a layer that can retain an electric or electrostatic charge; breathability; inertness or stain resistance such as by inclusion of a fluoropolymer layer; desired mechanical properties such as a frictional property (high or low coefficient of friction, especially a low coefficient of friction for wiping), high or low elasticity, high or low modulus, high or low strength, tear resistance, puncture resistance; high or low temperature resistance; flame retardance; desired aesthetic properties such as color; a property of enabling a particular size of fiber, fibril, or microfiber, or a desired surface area of a fiber, fibril, or microfiber surface; electrostatic properties such as the ability to hold an electrostatic charge and attract dust or other relatively small particles; anti-microbial properties; or a combination thereof. These separate properties can be associated with one or more different layers of a multi-layer film to provide a desired combination of properties based on the combined properties of the different layers.

The term "multi-layer film" refers to films that include at least two layers, with (according to the invention) one or more layers being a microfiber-forming layer, and optionally one or more non-microfiber layers. Different properties, such as those discussed elsewhere within the present description, can be associated with either a microfiber-forming layer or a non-microfiber-forming layer. More specifically, "multi-layer" refers to films that include two or more layers of materials that may be the same, different, or similar, and which, according to the invention, may be used to prepare a microfiber article, for example a microfiber article including two or more layers of materials, at least one of which is a microfiber layer, and which different layers preferably independently provide useful or desirable properties to the microfiber article.

In general, the thickness of layers of a multi-layer film can be any useful thickness based on factors such as the composition of a layer and its desired function within a microfiber article. The total thickness of a multi-layer film useful according to the invention may also be based on factors such as the composition of the intended microfiber article, the composition of layers of the microfiber article, and the intended utility of the microfiber article. The term "multi-layer" films does not include films referred to as "microlayer films," as described in U.S. Pat No. 6,680,114 and incorporated herein reference. Multi-layer films may, however, include such microlayer films as one or more layers within a multi-layer film.

The thickness of a layer of multi-layer film can be chosen based on overall product construction, which can relate to the total number of layers of a film and their purposes, as well as the composition and function of a layer. For example, a non-microfiber layer such as an elastomeric layer may be of a thickness that gives a desired mechanical property such as elasticity. The thickness required for a desired elasticity will depend on the material used for that layer of film. In an oriented film construction, prior to fibrillation, useful non-microfiber layers generally can each be, e.g., of a thickness in the range from about 13 to about 10,160 micrometers, preferably from about 50 to about 2,540 micrometers. Certain useful elastomeric layers may each, for example, be in the range from about 25 to about 1,200 micrometers, preferably from about 50 to about 250 micrometers in thickness.

The microfiber-forming layers can be of a thickness to allow microfibrillation. Also, thickness of a microfiber-forming layer may be selected based on the degree of microfibrillation intended to occur in that layer, and whether that layer is adjacent to another microfiber-forming layer, which, perhaps, is intended to be microfibrillated through the first microfiber-forming layer. In some embodiments of the invention, a microfiber-forming layer may be of a thickness to allow microfibrillation fully through the microfiber-forming layer, e.g., to expose an adjacent layer of the film which may be a microfiber-forming layer that may also be fibrillated, or to expose a non-microfiber layer. The thickness of any particular microfiber-forming layer may also be influenced by the overall product construction and composition of the multi-layer film and its different layers. Typically, the thickness of a microfiber-forming layer of an oriented multi-layer film may be in the range from about 5 to about 2,540 micrometers, with thicknesses in the range from about 10 to about 508 micrometers sometimes being preferred.

Overall, multi-layer films useful according to the invention can have a number of layers each of a useful size (thickness) and composition to allow for the production of a useful microfiber article. Multi-layer films may include, for example, 2, 3, 4 to 8 to 10 layers, with the lower range, e.g., below 5 layers, being typical. The total thickness of a multi-layer film prior to fibrillation can be any thickness that will be useful in preparing a microfiber article as described herein, with exemplary thicknesses being in the range from about 25 to about 10,160 micrometers, e.g., in the range from about 50 to about 254 micrometers.

The composition of different layers of a multi-layer film can be chosen to provide different properties to a multi-layer film and a microfiber article prepared from the film. The composition of a layer may be any desired material, and often includes a polymeric material, sometimes a polymeric material that can be extruded as a single layer of material or that can be co-extruded as a layer of a co-extruded multi-layer film, and can also, according to the invention, be chosen either as a material that can produce microfibers or one that cannot produce microfibers but that can preferably provide a microfiber article with a different desired property.

Typical or preferred properties of different layers of a multi-layer film used according to the invention are described generally above. Of these different properties, any can be associated with either of a microfiber-forming layer, a microfiber layer, or a non-microfiber layer. Examples of certain properties that can be associated with a microfiber-forming layer or a microfiber layer include properties of attracting or repelling water or oil; electrostatic or insulative properties; aesthetic properties such as colors; and properties of being capable of forming a particular size of microfiber or microfiber surface area. Examples of certain properties that can be associated with a non-microfiber layer can include electrically conductive or insulative properties; inertness or chemical resistance; mechanical properties such as strength, modulus, elasticity, or puncture or tear resistance; the ability to form fibrils or flakes that are not of the small size of microfibers; and aesthetic properties. Of course, these descriptions of exemplary properties of different types of film layers do not exclude any property from being associated with any type of layer of a multi-layer film, and the invention generally allows for any of these or other desired or useful properties to be associated with any layer of a multi-layer film.

Useful materials for a non-microfiber layer can include any material that can be used to produce a non-microfiber layer of a useful microfiber article. A non-microfiber layer can be included to provide a desired property, as described. As an example, a non-microfiber layer can provide mechanical support for a microfiber layer in a microfiber article. For example, a polymeric material such as high modulus poly (ethylene terephthalate) (PET) may function as a relatively stiff, high-strength support layer for a microfiber-forming layer.

Other non-microfiber layers can be prepared from materials chosen to provide a support property, but also to provide a property that is more than just the structural support of a microfiber layer, and therefore, many preferred materials for non-microfiber layers can be different from high modulus PET. For example, in addition to pure support, a non-microfiber layer can preferably, in some embodiments, have desired properties of puncture or tear resistance; elasticity; stain resistance; attraction or repulsion to water or oil; breathability; etc.

The term "elastomeric" refers to materials that are well-known in the film and polymeric material arts to exhibit elastomeric properties, for example that can be stretched easily to high extensions, e.g., 3 to 10 times their original dimensions, and rapidly recover their original dimensions when the applied stress is released. Exemplary materials considered to be elastomeric include butyl rubber, poly (isoprene), polyurethanes, and elastomeric polyolefins such as certain polypropylenes and polyethylenes. One specific useful elastomer includes the type of copolymers known generally as styrenic thermoplastic elastomeric block copolymers. Examples of specific block copolymers within this class include polystyrene-polyisoprene-polystyrene, polystyrene-polybutadiene-polystyrene, and polystyrene-poly (ethylene-butylene)-polystyrene based triblock copolymers. Such copolymers are commercially available from a variety of sources, for example under the brand-name Kraton™, from Shell, and from DEXCO, under the brand-name Vector™.

"High elastic modulus" materials include materials that are either glassy or at least partially crystalline. Examples of such materials can include, but are not limited to, nylons, fluoropolymers, polyesters, polystyrene, polycarbonate, polypropylene and polyethylene, particularly when highly oriented and crystalline.

A layer can be water resistant or waterproof, meaning in general that liquid water does not diffuse through the film layer. Water-resistant and water-proof materials include almost all non-porous, non-water-soluble polymers, but particularly include polypropylene, polyethylene, polystyrene, poly(ethylene terephthalate), fluoropolymers, polyurethane, tri-block copolymers with polystyrene end blocks and a rubbery poly(ethylene-butylene) or poly(isoprene) mid block, butyl rubber, and poly(isoprene).

A layer can be puncture resistant or tear resistant. The term "puncture resistant" refers to materials that require a significant amount of energy to puncture with a pointed or sharp object. Examples of materials considered to be puncture resistant include materials having a high friction or adhesive surface, such as tri-block copolymers with polystyrene end blocks and a rubbery poly(ethylene-butylene) mid block, butyl rubber, and polyethylene elastomers. The term "tear resistant" refers to materials that require a significant amount of energy to initiate and propagate a tear or crack. Examples of materials considered to be tear resistant include thermoplastics, especially modified thermoplastics and thermosets. Such materials include polypropylene, polyethylene, impact modified polystyrene, rubber modified epoxies, and elastomers, such poly(butylenes), poly(isoprene), and tri-block copolymers with polystyrene end blocks and a rubbery poly(ethylene-butylene) or poly(isoprene) mid block.

A layer can be associated with the property of breathability. The term "breathability" or "breathable" refers to materials that allow gasses, specifically water vapor, to pass though them, especially where liquids such as liquid water cannot. Examples of materials considered to be breathable include polyurethanes, and porous polymer films. Examples of porous polymer films include polypropylene, polyethylene, and fluoropolymers that have been blended with particulate fillers or solvent fillers and then oriented in a manner to create voids or pores in the film.

A layer can be associated with a property of high or low temperature resistance. This property refers to the ability to withstand extreme temperatures, for example in excess of 150° C. or below −23° C. Examples of materials considered to be high temperature resistant include materials such as fluoropolymers, nylons, and polyolefins such as highly crystalline polyester or propylene. Examples of materials considered to be low temperature resistant include materials such as polyethylenes, silicone rubbers, and highly crystalline polypropylenes that do not exhibit a significant glass transition.

A layer can be associated with a property of being flame retardant. Examples of materials considered to be flame retardant include materials such as halogenated polymers, such as poly(vinyl chloride), and also a variety of polymers containing flame retardant additives. Examples of flame retardant blends include polypropylene and polyethylene that contain: inorganic additives such as aluminum trihydrate, antimony trioxide, magnesium hydroxide, aluminum hydroxide; phosphorus compounds such as ammonium polyphosphate, polyphazenes, and aluminum phosphates; nitrogen additives such as melamine cyanurate and melamine phosphate; silicone polymer additives; halogenated additives like chlorinated compounds, brominated compounds, fluorinated compounds such as potassium perfluorobutanesulfonate; and other additives such as nano-clay particles, expandable graphite, silica gel, and potassium carbonate.

The multi-layer films according to the invention include at least one microfiber-forming layer. Microfiber-forming materials, e.g., microfiber layers, microfiber-forming films, or microfiber-forming film layers, useful according to the invention can include any materials that can be processed to form microfibers. Several classes of such materials exist and are known in the film and polymer arts. Examples of some of these materials, their methods of preparation, and methods of processing these materials to microfiber materials, are described in U.S. Pat. Nos. 6,110,588; 6,331,343; 6,468,451; and 6,420,024 the entirety of each of these disclosures being incorporated herein by reference.

Useful materials for a microfiber-forming layer can include any material that can be used to produce a microfiber-forming layer or microfiber layer of a microfiber article. Different properties can be associated with a microfiber layer. A microfiber-forming layer or microfiber layer can provide a microfiber surface having particular properties based on the size and composition of the microfibers. Additionally, a microfiber-forming layer or microfiber layer can provide properties that are independent of the presence or dimensions of the microfibers themselves, but relate to a property of the material that makes up the film or microfiber, for example properties that are mechanical, chemical, or aesthetic in nature, or otherwise are not based on the presence or dimensions of microfibers.

In addition to providing a microfiber surface, a microfiber-forming layer or microfiber layer can in some embodiments have desired mechanical properties such as high or low modulus; puncture and tear resistance; elasticity; stain resistance; attraction or repulsion to water or oil; breathability; etc., e.g., as discussed above.

A microfiber layer can exhibit attractive or repulsive forces with respect to certain chemical materials such as water or oil. Materials that exhibit such properties are often referred to as hydrophobic, hydrophilic, oleophobic, oleophilic, etc. These properties are well-known in the film and polymeric material arts. Exemplary materials considered to be hydrophobic, hydrophilic, oleophobic, oleophilic, etc., include the following, as well as others. Exemplary hydrophobic materials can include any one or more of a fluoropolymer or polyolefin such as polyethylene, polypropylene, or blends thereof, optionally containing other materials such as fillers or other hydrophobic polymers, such as fluoropolymers or thermoplastics.

Microfiber-forming layers and microfiber layers can also be: water resistant or waterproof, associated with a property of breathability, associated with a property of high or low temperature resistance, or associated with a property of flame retardance.

Of course, as will be understood by one of skill in the arts relating to polymeric materials and multi-layer materials, the multi-layer film can include other components such as layers that form fibers or fibrils that are not "microfibers"; or layers that serve the purpose of a tie-layer, to adhere two other layers together.

A layer of a multi-layer film may also have a coating or adhesive placed on a surface of the film, e.g., may include materials such as adhesives, primers, or protective coatings, etc., as desired. These "coatings" are not considered to be "layers" of a "multi-layer" film.

In accordance with the above description of properties related to a multi-layer film and layers thereof, multi-layer films that contain one or more microfiber-forming layers can be prepared from materials known in the polymeric material arts and other known methods.

In general, a "microfiber-forming material" is any material, especially a film or a layer of a multi-layer film, which is capable of being processed to form microfibers. Microfiber-forming materials are typically made of polymeric materials that can have a structure or morphology that includes features, which upon mechanical contact, will cause a microfiber to be formed from the polymeric film. Properties of a film that facilitate formation of microfibers, e.g., breaking or splitting of the film to form microfibers, can include structural features such as microvoids, spherulites, or other additives or disturbances in the polymer, e.g., calcium carbonate; orientation of the film, e.g., bi-axially, but especially mono-axially (uni-axial orientation); multiple layers, especially where an interface at surfaces of different layers weakens the internal structure of a multi-layer film; and morphology, such as crystallinity. These features can be present alone in a film to allow microfibrillation. Alternatively, two or more of the different features can be present in combination. When combinations of different properties are present, the amount or severity of one or both properties may be reduced relative to the amount or severity of that property that would be necessary to allow microfibrillation if only that single property were present.

Properties that may facilitate microfibrillation can be created in a film during manufacturing of the film to cause the film to be a microfiber-forming film. In general, the described properties and combinations of the properties can be produced in a polymeric film by selecting one or more of the composition of the film, processing conditions, e.g., processing conditions during extrusion or co-extrusion of a film or multi-layer film, and processing conditions after extrusion or co-extrusion, possibly including individual steps or combinations of steps such as casting, quenching, annealing, calendering, orienting, solid-state drawing, roll-trusion, and the like.

Polymeric films typically comprise long molecular chains having a backbone of carbon atoms. The facility with which the surface of a polymer film can be microfibrillated is often not realized due to random orientation and entanglement of the polymer chains. As one method of facilitating microfibrillation, polymer chains can be oriented to be relatively more parallel to one another and partially disentangled. The degree of molecular orientation is generally defined as the draw ratio, which is the ratio of the final length to the original length. This orientation may be effected by a combination of techniques, including the steps of calendering and length orienting.

Microfibrillation of certain polymeric layers can be facilitated by orientation, especially with some films, uni-axial orientation. Uni-axial orientation means that the film is lengthened or stretched in one direction relatively more than it is stretched in another, e.g., perpendicular, direction. By exemplary methods, a film can be stretched in a machine direction while its width is not held, and the film gets longer in length, thinner, and narrower in width. In another exemplary method, the width may be held constant while the length is stretched. In other words, sufficient orientation may be achieved for microfibrillation by inducing a relatively greater amount of orientation in one direction, the machine direction, compared to a lesser degree of orientation in another direction, especially a perpendicular direction, such as the cross direction.

Bi-axial orientation of a film can also be used to provide microfibers. For example, a film can be oriented, e.g., stretched or lengthened, in two directions, with stretching or lengthening in one direction being sufficient to produce microfibers. (If not sufficiently oriented, a bi-axially oriented film may alternatively be fibrillated to produce flakes or other fibrils that are not microfibers.) Preferably, to produce microfibers, a bi-axially oriented film can be oriented to a draw ratio of at least 4:1 or 5:1, in one direction.

Crystallinity also affects the ability of a film to form microfibers. A variety of semi-crystalline, crystalline, and highly-crystalline materials can be processed to form microfibers. Examples of polymeric materials for forming microfiber-forming films can include semicrystalline melt processed films having a maximized crystallinity induced in the polymeric film layer by an optimal combination of casting and subsequent processing such as calendering, annealing, stretching and recrystallizing. For polypropylene, as an example, preferred crystallinity can be above 60%, preferably above 70%, most preferably above 75%. The crystallinity may be measured by differential scanning calorimetry (DSC) and comparison with extrapolated values for 100% crystalline polymers. See, e.g., B. Wunderlich, Thermal Analysis, Academic Press, Boston, Mass., 1990.

Microfiber-forming materials and films also may contain spherulites and microvoids to facilitate microfibrillation. See, e.g., U.S. Pat. No. 6,110,588.

Any suitable combination of polymer film composition and processing steps and conditions may be used to impart sufficient microscopic structure, e.g., crystallinity, microvoids, spherulites, multiple layers, orientation, etc., to produce a layer of a multi-layer film that will form microfibers upon microfibrillation. These conditions may include combinations of casting, quenching, annealing, calendering, orienting, solid-state drawing, roll-trusion, and the like.

Some specific examples of materials that can be used to prepare a microfiber-forming film layer are discussed, e.g., in U.S. Pat. No. 6,110,588. Exemplary semicrystalline polymers include high and low density polyethylene, polypropylene, polyoxymethylene, poly(vinylidine fluoride), poly (methyl pentene), poly(ethylene-chlorotrifluoroethylene), poly(vinyl fluoride), poly(ethylene oxide), poly(ethylene terephthalate), poly(butylene terephthalate), poly(lactic acid), nylon 6, nylon 66, polybutene, and thermotropic liquid crystal polymers. Examples of suitable thermotropic liquid crystal polymers include aromatic polyesters that exhibit liquid crystal properties when melted and that can be synthesized from aromatic diols, aromatic carboxylic acids, hydroxycarboxylic acids, and other similar monomers. Typical examples include a first type consisting of parahydroxybenzoic acid (PHB), terephthalic acid, and biphenol; a second type consisting of PHB and 2,6-hydroxynaphthoic acid; and a third type consisting of PHB, terephthalic acid, and ethylene glycol. Preferred polymers include polyolefins such as polypropylene and polyethylene which are readily available at low cost and can provide highly desirable properties in microfibrillated articles such as high modulus and high tensile strength.

Preferred semicrystalline polymers can include high density polyethylene, low density polyethylene, polypropylene, polyoxymethylene, poly(vinylidine fluoride), poly(methyl pentene), poly(ethylene-chlorotrifluoroethylene), poly(vinyl fluoride), poly(ethylene oxide), poly(ethylene terephthalate), poly(ethylene naphthalate), poly(butylene terephthalate), poly(lactic acid), nylon 612, nylon 6, nylon 66, polybutene, a thermotropic liquid crystal polymer, a blend of one or more of these polymers with another of these or another polymer, or a copolymer made from any of the listed monomers, and any other listed monomer or a different monomer.

The molecular weight of the polymer can be chosen so that the polymer is melt processable (i.e., extrudable or co-extrudable) under the processing conditions used in extrusion and co-extrusion. For polypropylene and polyethylene, for example, the molecular weight may be from about 5,000 to 499,000 and is preferably from about 100,000 to 300,000.

Referring again to the '588 patent, it describes that any suitable combination of processing conditions may be used to impart crystallinity and orientation to a melt-processed film. Starting with a melt-processed, cast film, for example, the film may be calendered, stretched, oriented, cast, quenched, annealed, drawn, roll-truded, etc. Such processing generally serves to increase the degree of crystallinity of the polymer film as well as the size and number of spherulites.

The '588 patent describes additional details and recites examples of preferred embodiments of materials and techniques, and optional processing steps, that may be used to prepare useful microfiber-forming films. That description, along with the balance of the present disclosure and knowledge available to a skilled artisan will enable the preparation of multi-layer films as well as microfiber articles derived from the multi-layer films, as described herein.

Another class of microfiber-forming materials that can be included as a microfiber-forming layer of a multi-layer film as described herein, includes microfiber-forming materials described in U.S. Pat. No. 6,468,451, the entirety of which is incorporated heroin by reference. This patent application describes high melt strength polypropylene foams prepared by extruding a foamable mixture comprising a high melt-strength polypropylene and a blowing agent, and orienting in at least one direction.

The high melt strength polypropylene includes homo- and copolymers containing 50 weight percent or more propylene monomer units, preferably at least 70 weight percent, and has a melt strength in the range of 25 to 60 cN at 190° C. Melt strength may be measured using an extensional rheometer by extruding the polymer through a 2.1 mm diameter capillary having a length of 41.9 mm at 190° C. and at a rate of 0.030 cc/sec; the strand is stretched at a constant rate while measuring the force. Preferably the melt strength of the polypropylene is in the range of 30 to 55 cN, as described in U.S. Pat. No. 6,251,319, the entirety of that disclosure being incorporated by reference.

The foamable polypropylene may consist of propylene homopolymers or may comprise a copolymer having 50 weight percent or more propylene monomer content. Further, the foamable polypropylene may comprise a mixture or blend of propylene homopolymers or copolymers with a homo- or copolymer other than propylene homo- or copolymers.

A variety of blowing agents may be used, including physical blowing agents and chemical blowing agents. The amount of blowing agent incorporated into a foamable polymer mixture can be chosen to yield a foam having a void content in excess of 10%, and even in excess of 20%, as measured by density reduction; i.e., 1−(the ratio of the density of the foam to that of the neat polymer)×100. Generally, these greater foam void contents can enhance microfibrillation and can produce a greater yield of a microfibrillated surface.

To facilitate microfiber-formation from a multi-layer film as described, the film (i.e., its polymer chains) may be oriented along at least one major axis. Suitable stretching conditions can be used to increase the crystallinity of the polymer and the void volume of the foam.

Other components, e.g., non-polymeric materials, may be mixed into a polymeric material of a multi-layer film to facilitate microfiber formation, such as void-initiating components, calcium carbonate, or others, e.g., as described in U.S. Pat. No. 6,331,343, the entire disclosure of which is incorporated herein by reference.

Methods for producing multi-layer films are well known in the arts of polymeric materials and film processing, and materials such as those described herein can be used with those methods to produce multi-layer films that contain at least one microfiber-forming layer, from those materials. Examples of useful techniques include casting, extrusion, co-extrusion, lamination, and other known methods of producing films that are well known and understood in the polymer film arts. Useful equipment for producing the films will also be apparent to those of ordinary skill and will include extruders, multi-cavity dies, multilayer feedblocks, laminators, as well as various other types of equipment known in the arts of films and film processing, some of them being mentioned herein. Also well known in the art of polymeric films are subsequent processing techniques for films such as casting, quenching, annealing, calendering, orienting, solid-state drawing, roll-trusion and the like. Using these techniques, suitable equipment, and the present disclosure, a skilled artisan will be able to prepare multi-layer microfiber-forming films and microfiber articles according to the invention.

The different steps of extrusion, casting, orienting, calendering, etc., can be done in any order that is useful for preparing a film as described herein. More than one of any step (e.g., two lengthening steps) may be used.

One example of a method of producing a multi-layer film of the invention is to co-extrude a multi-layer (e.g., 2 or 3 layer) film, then orient by calendering and/or lengthening, to produce at least one microfiber-forming layer.

Another exemplary method is to first extrude and orient a single layer of film. Onto that oriented film, one or more additional film layers can be cast. The multi-layer film can then be oriented to produce a multi-layer film having at least one microfiber-forming layer. As one specific example, a first layer can be extruded and oriented in a first direction. A second layer can then be cast onto the oriented film. The two-layer film can be oriented again in a second direction, e.g., perpendicular to the first orientation, to produce a two-layer film comprising one layer that is uni-axially oriented and one layer that is bi-axially oriented. At least one of the layers can be microfibrillated to produce microfibers. Calendering and other steps can optionally be included where appropriate or desired.

Still other combinations of these processing steps can be used in any variety to prepare multi-layer films as described herein.

Once a multi-layer film is prepared, a multi-layer film can be microfibrillated to produce a microfiber surface by any of a variety of methods known to be useful for microfibrillating.

The term "microfibrillation," as used herein, refers to methods of imparting energy to liberate microfibers from a polymeric film. Such methods are known in the art of processing polymeric materials, and include methods of imparting a gaseous fluid using, for example, ultrasound techniques, and methods of imparting liquid fluids such as water, for example using high-pressure water jets. Optionally, prior to microfibrillation, a film may be subjected to a conventional, mechanical, fibrillation step to produce macroscopic fibers from the multi-layer film, such as by the use of a rotating drum or roller having cutting elements such as needles or teeth in contact with the moving film, or by twisting, brushing (as with a porcupine roller), rubbing, for example with leather pads, and flexing.

A microfibrillated surface is a surface that includes microfibers from one or more layers of a multi-layer film. The microfibers are portions of one or more multi-layer film layer or layers that have been mechanically separated or fragmented from the continuous film, and are therefore typically relatively flat, thin, or elongate, e.g., "ribbon-shaped," with a typically rectangular cross section. The microfibers preferably remain attached to the film at one end, but may also become completely detached from the base film.

Microfibers typically have a rectangular cross section with a cross sectional aspect ratio (transverse width to thickness) ranging from about 1.5:1 to about 20:1, preferably from 3:1 to 9:1. Preferred microfibers can also have one or more of the following features or dimensions: an average effective diameter of from 0.01 to 10 microns, preferably of less than 5 microns; an average cross-sectional area of 0.5 $\mu^2$ to 3.0 $\mu^2$, preferably from about 0.7 $\mu^2$ to 2.1 $\mu^2$. Further, the sides of the rectangular shaped microfibers are not normally smooth, but may have a scalloped appearance in cross section. Certain preferred microfiber surfaces may exhibit a relatively high surface area, up to or exceeding 0.25 square meters per gram, as measured using an Quantachrome AUTOSORB 1-KR gas sorption instrument (available from Quantachrome Corp., Boyhton Beach, Fla.) with krypton adsorbate.

One method of microfibrillating a film surface is with fluid jets. In this process, one or more jets of a fine fluid stream impact the surface of a multi-layer film which may be supported by a screen or moving belt, thereby releasing microfibers from a film's polymer matrix. The degree of microfibrillation is dependent on the exposure time of the film to the fluid jet, the pressure of the fluid jet, the cross-sectional area of the fluid jet, the fluid contact angle, the polymer properties and, to a lesser extent, the fluid temperature.

Any type of liquid or gaseous fluid may be used. Liquid fluids may include water or organic solvents such as ethanol or methanol. Suitable gases such as nitrogen, air, or carbon dioxide may be used, as well as mixtures of liquids and gases. Any such fluid is preferably non-swelling (i.e., is not absorbed by the film), which would reduce the orientation and degree of crystallinity of the microfibers. The fluid can preferably be water.

The fluid temperature may be elevated, although suitable results may be obtained using ambient temperature fluids. The pressure of the fluid should be sufficient to impart some degree of microfibrillation to at least a portion of the film, and suitable conditions can vary widely depending on the fluid, the nature of the polymeric material, including the composition and morphology, configuration of the fluid jet, angle of impact and temperature. Typically, the fluid can be water at room temperature and at pressures of at least 3400 kPa (500 psi), although lower pressure and longer exposure times may be used. Such fluid will generally impart a minimum of 5 watts/cm$^2$ or 10 W/cm$^2$ based on calculations assuming incompressibility of the fluid, a smooth surface, and no losses due to friction.

The jets may be configured such that all or part of the film surface is microfibrillated. Alternatively, the jets may be configured so that only selected areas of the film are microfibrillated. Certain areas of the film may be masked, using conventional masking agents, screens or films, to leave selected areas free from microfibrillation. Likewise, microfibrillation may be conducted so that the microfibrillated surface penetrates only partially, or fully through the thickness of a microfiber-forming layer of a multi-layer, or fully or partially through one or more adjacent microfiber-forming layers. When combined with masking different areas of a microfiber-forming film, penetrating different thicknesses of a multi-layer film can advantageously produce a microfiber article having different microfibers on different areas of a surface. If it is desired that the microfibrillation extend through the entire thickness of the multi-layer film, conditions may be selected so that the integrity of the article is maintained and the film is not severed into individual yarns or fibers, for example by microfibrillating the multi-layer film only in selected regions.

A hydroentangling machine, for example, can be used to microfibrillate a surface by exposing the film to its fluid jets. Alternatively, a pressure water jet, with a swirling or oscillating head, may be used, which allows manual control of the impingement of the fluid jet. Such machines are commercially available.

Microfibrillation may be accomplished by other methods as well, as will be understood by the skilled artisan, e.g., by immersing a microfiber-forming material in a high energy cavitating medium, e.g., and achieving cavitation by applying ultrasonic waves to the fluid.

The multi-layer film, upon microfibrillation to produce at least one microfiber surface, becomes a multi-layer microfiber article. One example of a microfiber article of the invention is a microfiber article containing two layers that are both microfiber layers. Another example is a microfiber article that contains two layers, where one layer is a microfiber layer and one is a non-microfiber layer.

Microfiber articles of the invention may also contain three or more layers. In a three-layer microfiber article, one or more layer may be a microfiber layer at a surface of the article. A non-microfiber fiber layer may be included as a support layer and/or to exhibit a property other than support of a microfiber layer. A second microfiber layer may be present on the second surface of a microfiber article such that one or more non-microfiber layer is sandwiched between microfiber layers present at both surfaces of the microfiber article.

According to any of these or other embodiments of multi-layer microfiber articles, different materials used for different layers of a multi-layer film may be chosen to provide any desired combination of properties. Examples of desired combinations of materials used in different layers of a multi-layer film or microfiber article of the invention may include a hydrophilic surface layer opposite of an oleophilic surface layer; an elastomeric, soft-rubbery, or flexible non-microfiber (e.g., inner layer) and one or two microfiber-forming surface layers that are any of hydrophobic, hydrophilic, oleophobic, oleophilic; one surface with microfibers for picking up dust and an opposite surface with larger flakes, fibers, or fibrils, for picking up larger particles, etc. A non-microfiber layer may still be capable of being fibrillated to form fibrils that are not microfibers. Such a layer could be used in combination with microfiber-forming layers or non-microfiber-forming layers to produce various product constructions such as a cloth with a microfiber surface on one side, e.g., for picking up dust, and a (non-microfiber) fibrous surface on the other side, e.g., for picking up other larger particles such as sand or sawdust; or, larger fibrils could be used to scrub and small microfibers could be used to polish.

Other examples of microfiber articles include cloths or cloth-like materials, e.g., for cleaning; tape backings; filter materials; fibrous mats; thermal and acoustical insulation; wipes; adhesive bandages; as well as others. Also, the multi-layer films, as well as microfiber articles made from the films, can be processed with other materials, including other microfiber-forming materials and other materials that are not microfiber-forming materials. See, e.g., Assignee's copending U.S. patent application Ser. No. 09/858273, entitled "Microfiber-Entangled Products and Related Methods," filed May 15, 2001, and incorporated herein by reference.

One embodiment of a microfiber article of the invention is a two-layer microfiber article, wherein one layer is a microfiber layer and the other layer is either a microfiber layer or a non-microfiber layer.

FIG. 1 shows two-layer co-extruded film 6 having layers 2 and 4, where each layer can be chosen to provide a property such that a microfiber article prepared from the film exhibits a desired combination of properties. Layer 2 is a microfiber-forming layer. Layer 4 can be a microfiber-forming layer or a non-microfiber-forming layer. In either case, layer 4 can be selected to provide a desired property in combination with properties of microfiber-forming layer 2. If layer 4 is chosen to be a microfiber-forming layer, it can be chosen to provide a property that is the same as or different from properties of microfiber-forming layer 2. If layer 4 is a non-microfiber layer, it can be chosen to provide a property that is or is not merely for support of microfiber-forming layer 2, e.g., non-microfiber layer 4 can be chosen to exhibit one or more desired properties in addition to performing the function of a support layer. For example, such a layer can be an elastomeric material or can exhibit any one or more of the properties of a non-microfiber layer discussed elsewhere in this description.

Exemplary combinations of materials of a two-layer film wherein both layers are microfiber layers include the following: a hydrophobic layer and a hydrophobic layer; a hydrophilic layer and an oleophilic layer.

In a specific embodiment of FIG. 1, a microfiber article can include exactly two layers, one of which comprises a microfiber surface and one of which is a non-microfiber layer. A non-microfiber layer may be a soft rubbery material, e.g., an elastomeric material. Exemplary materials for an elastomeric non-microfiber layer include butyl rubber, poly (isoprene), polyurethanes, and elastomeric polyolefins such as certain polypropylenes and polyethylenes. One specific useful elastomer includes the type of copolymers known generally as styrenic thermoplastic elastomeric block copolymers. Examples of specific block copolymers within this class include polystyrene-polyisoprene-polystyrene, polystyrene-polybutadiene-polystyrene, and polystyrene-poly (ethylene-butylene)-polystyrene based triblock copolymers. Such copolymers are commercially available from a variety of sources, for example under the brand-name Kraton, from Shell, and from DEXCO, under the brand-name Vector.

Exemplary combinations of materials of a two-layer film wherein one layer is a microfiber layer and the second layer is a non-microfiber layer, include the following: an elastomeric non-microfiber layer in combination with a microfiber layer that is chosen from a hydrophilic, hydrophobic, oleophilic, or oleophobic layer; an elastomeric layer with a microfiber layer that attracts dust or particles; a microfiber layer with a non-microfiber layer that is flame retardant, puncture resistant, or tear resistant. As a more specific example, a two-layer film could include a microfibrillated polypropylene surface on one side, and a blend containing polypropylene, sorbitan monolaurate and glycerol monolaurate on the other side to wipe up water.

Figure 1A:
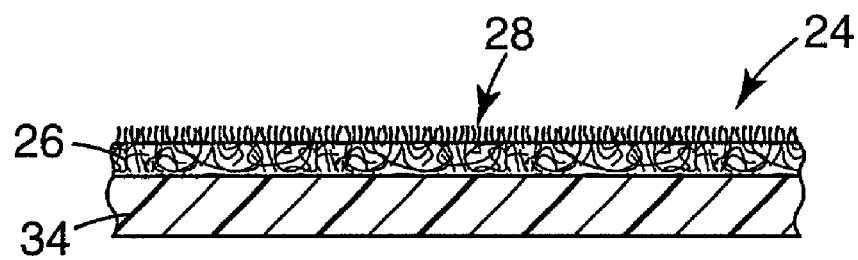
FIG. 1a illustrates a cross-section of an embodiment of a microfiber article of the invention.

FIG. 1a illustrates an embodiment of a two-layer film, showing microfiber article 24 having non-microfiber layer 34, which can be, for example, an elastomeric layer, and microfiber layer 26 with microfiber surface 28. The materials of each of layers 34 and 26 can be chosen to provide a desired combination of properties.

Another embodiment of a two layer microfiber article includes two microfiber layers and two microfiber surfaces. The microfiber layers can be chosen to exhibit a useful combination of properties. An example of such an article is illustrated in FIG. 1b, which shows microfiber article 30 having microfiber layers 32 and 36 and microfiber surfaces 38 and 40, respectively.

Figure 1B:
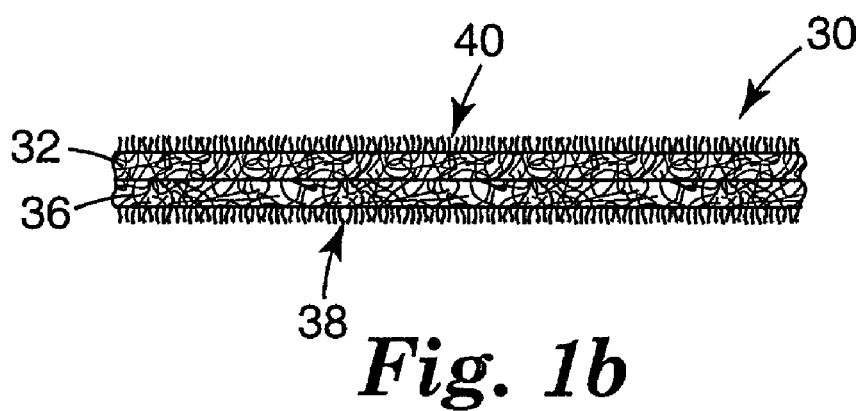
FIG. 1b illustrates a cross-section of an embodiment of a microfiber article of the invention.

While not shown in FIG. 1b, microfiber article 30 could be microfibrillated to cause microfiber formation down to any desired depth of either of layers 32 or 36, such as microfibrillation of only the two surfaces; or microfibrillation of a surface of one of either layer, and microfibrillation fully through the other layer, optionally to cause microfibrillation of the internal surface of the first layer in contact with the second layer; or microfibrillation fully through both layers.

More generally, microfibrillation of any multi-layer film, e.g., a two-layer film like that of FIG. 1b, having two microfiber-forming layers, may be controlled to cause microfibrillation through a full layer and to a second microfiber-forming layer, to produce microfibers at the interface between the two layers and into the second layer, so that one or both types of microfibers can be present at a single microfiber surface. The other surface may or may not be microfibrillated. This can produce an article with only one microfiber surface, with that microfiber surface having microfibers from both layers.

A different embodiment of a multi-layer film can have three or more layers, at least one of which is a microfiber-forming layer. For example, two layers may be microfiber-forming layers and a third layer (or more layers) may be a non-microfiber-forming layer.

Figure 2:
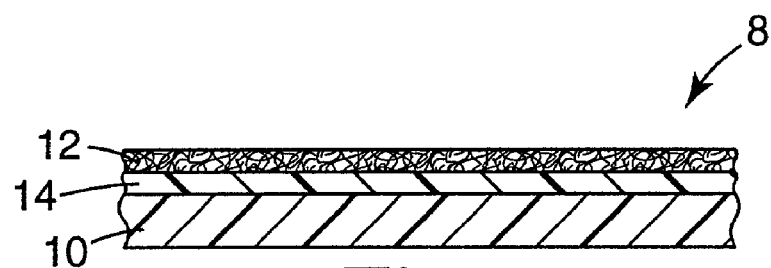
FIG. 2 illustrates a cross-section of an embodiment of a multi-layer film of the invention.

FIG. 2 shows an embodiment of a three-layer film wherein one surface includes a microfiber-forming layer and one surface includes a non-microfiber-forming layer. Film 8 includes layers 10, 12, and 14. In exemplary film 8, layer 10 can be a non-microfiber-forming layer, and layer 12 can be a microfiber-forming layer. Layer 14 can be either a microfiber-forming layer or a non-microfiber layer.

Figure 2A:
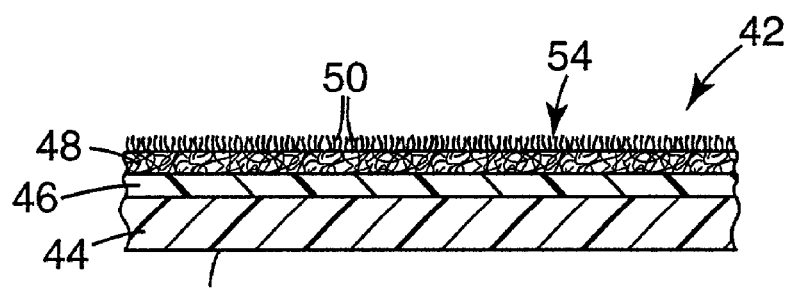
FIG. 2a illustrates a cross-section of an embodiment of a microfiber article of the invention having a non-microfiber surface and a microfiber surface.

In a version of the invention illustrated in FIG. 2a, microfiber-forming layers may be adjacent to one another and a non-microfiber layer may be adjacent to only one microfiber-forming layer. FIG. 2a shows microfiber article 42 having non-microfiber layer 44 adjacent to microfiber-forming layer 46, which is adjacent to microfiber-forming layer 48. Microfiber article 42 has non-microfiber surface 56, and microfiber surface 54. Microfiber-forming layer 48 has been microfibrillated to produce microfibers 50, and has been microfibrillated (at least at a portion of its area) fully through the microfiber forming layer 48. Over at least those portions of the area, microfiber-forming layer 46 has also been microfibrillated (through layer 48) to produce microfibers 52, so that both of microfibers 50 and 52 make up the microfiber surface 54. While FIG. 2a illustrates microfiber article 42 with two adjacent microfiber layers 46 and 48, one of which can be fibrillated fully through and one of which can be fibrillated partially through, more than two microfiber layers may be used, with two or more being fibrillated fully through and one (typically) being fibrillated at least partially through. Similarly, this could be done on two surfaces of a microfiber article, as well as one (as illustrated).

Exemplary combinations of materials of a three-layer film according to FIG. 2 wherein the middle layer 14 is a microfiber layer, include a construction according to FIG. 2a, where layer 48 can be a microfibrillated polypropylene layer, layer 46 can be a microfibrillated blend containing polypropylene, sorbitan monolaurate and glycerol monolaurate, and layer 44 can be an elastomeric non-microfibrillated layer. This construction would be useful in applications where it is desired for water to be repelled from the top surface, but absorbed in the middle layer. An example of such an application could be a dry-to-touch floor mat.

Figure 3:
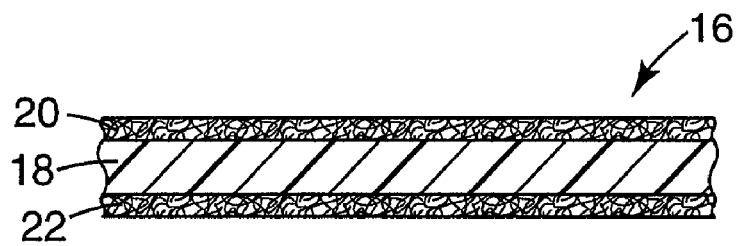
FIG. 3 illustrates a cross-section of an embodiment of a multi-layer film of the invention having a core layer and two surface layers.
Figure 3A:
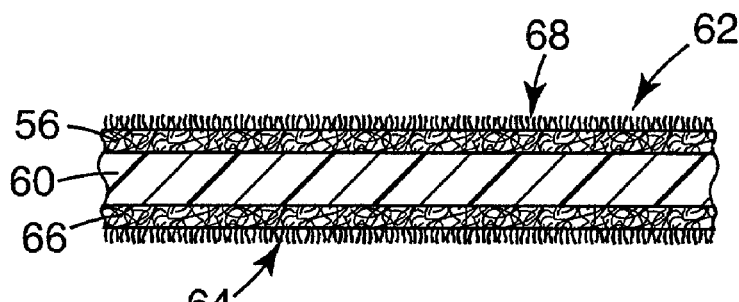
FIG. 3a illustrates a cross-section of an embodiment of a microfiber article of the invention having a non-microfiber-forming core layer and two microfiber surfaces.

FIG. 3 shows film 16 having a non-microfiber-forming core layer 18, such as an elastomeric polymer, and surface layers 20 and 22, which can be microfiber-forming layers, and can be the same or different. The combined properties of the three layers can be chosen as desired to provide a useful microfiber article. For example, the properties of the three layers can combine to produce a flexible hard rubber or elastomeric cloth-like article with microfiber surfaces that might independently be hydrophobic, hydrophilic, oleophobic, oleophilic, etc. Or, the different layers may be chosen to have different microfiber surface properties, or preferred mechanical properties.

Exemplary combinations of materials of a three-layer film according to FIG. 23, wherein the middle layer 14 is a non-microfiber layer, include the following: an elastomeric non-microfiber core layer with two microfiber skin layers, the microfiber layers being independently any of hydrophobic, hydrophilic, oleophobic, or oleophilic; a mechanically stiff non-microfiber core layer with two microfiber skin layers; or a water-proof and/or breathable non-microfiber core layer with two microfiber skin layers. Another advantage of using a multi-layer film in which the two surface layers are fibrillated is the utility of having the core layer contain a tie layer, which can hold two microfiber layers together.

Other examples of three-layer films could include a fluoropolymer or elastomeric core, or a core of a more rigid solid plastic, and two microfibrillated surfaces, which may be useful as a water-proof cloth, a rigid polishing or scrubbing pad, or possibly a surgical drape.

Another example of a multi-layer film of the invention incorporates the use of a multi-layer film that can be microfibrillated through one layer to a lower level, to produce microfibers from two or more layers of the film on a single surface of the film, with fibrillation of the surface in a pattern where different areas of the pattern are fibrillated to different depths to produce exposed microfibers from different layers of the multi-layer film.

Specifically, microfiber articles of the invention can be produced to include microfibers from different layers of a multi-layer film at a single surface of the microfiber article. FIG. 2a shows multi-layer film 42 with microfibers 50 and 52 present at surface 54 of the film, originating from two different layers 46 and 48 of the multi-layer film. Thus, according to the invention, the surface 54 can include microfibers of different layers, and each the microfibers from each layer can be selected to have a different property, including any of the properties mentioned herein, or otherwise.

According to a specific embodiment of the invention, the surface of such a multi-layer article can be fibrillated in a pattern, to different degrees (or depths) to produce exposed microfibers from the different layers, and to cause the surface to have selected microfibers from the different layers over different areas of the article. For instance, referring to FIG. 2a, portions of surface 54 may be microfibrillated into only layer 48 such that those portions of the surface 54 include microfibers 50 from layer 48. These portions may be produced in any pattern, such as a strip, circle, rectangle, triangle, curves, or otherwise. Other areas of surface 54 can be fibrillated to produce microfibers from layer 46. By selective microfibrillation of different areas of surface 54 on multi-layer film 41, in some areas into only the outermost layer 48 and in some areas into a deeper layer 46, a microfiber article can include an area having microfibers 50 from only layer 48, and can have a second area having microfibers 52 of layer 46. In this embodiment, any microfibers 48 produced in the second area of microfibers 52 may preferably become unattached, leaving only microfibers 52 from layer 46 on that area.

The different layers 46 and 48 can be chosen to provide the first and second microfiber areas on the same surface, having a desired combination of first and second properties on surface 59 of the microfiber article. The surface can be of any pattern, as discussed, and can have different areas, in combination, chosen from microfibers that are hydrophilic, hydrophobic, oleophilic, oleophobic, stain resistant, temperature resistant, etc. A preferred article, for instance, may have different microfiber areas in the combination of an area of hydrophilic microfibers and an area of oleophilic or hydrophobic microfibers.

Exemplary Microfibrillated Multi-Layer Film Preparation Processes

Process I—Casting of Multi-Layer Films

Multi-layer films were prepared by coextrusion of polymer melt streams through a 25.4 cm wide Cleoron 3-Layer coextrusion die, resulting in an A-B or A-B-C multi-layer film construction. The die was maintained at 243° C. The polymer melt stream for the A-layer of the multi-layer film was extruded into the 3-layer die using a 51 mm single screw extruder. The extruder temperature settings increased from 204° C. to 260° C. from the first heated section of the extruder to the die. The melt stream for the B-layer of the multi-layer film was extruded into the 3-layer die using a 25 mm twin-screw extruder. The extruder temperature settings increased from 204° C. to 243° from the first heated section to the output of the extruder. The melt stream for the C-layer of the multi-layer film was extruded into the 3-layer die using a 38 mm single screw extruder. The extruder temperature settings increased from 204° C. to 260° from the first heated section to the output of the extruder.

The output of the coextrusion die traveled over a single stainless-steel cast roll that was water heated to 99° C., with the A-layer of the resulting multi-layer cast film contacting and electrostatically pinned to the cast roll to help improve the quality of the film surface. The density of the resulting multi-layer cast film was determined as described in Test Procedure II below.

Process II—Calendering and Length Orienting of Multi-Layer Cast Films

Multi-layer cast films were calendered and length oriented on a series of rolls, including a calender. In this process, the cast film was fed from an unwind station through a series of idler rolls and into the compressive nip of a calender (rolls 1 and 2). The film exiting rolls 1 and 2 was further oriented as it passed over heated rolls 3 and 4 and cooled by traveling over an unheated roll 5. The resulting oriented film was wound onto a core under tension. For each of the films, the speed of roll 4 was set at a speed just below the speed at which the film would break. Test Procedure I described below was used to determine the draw ratio of the resulting film. Test Procedure II described below was used to determine the density and void content of the resulting film.

Process III—Microfibrillation of Oriented Multi-Layer Films

Calendered and length-oriented multi-layer films were microfibrillated on one or both major surfaces in a hydroentangler (70 cm wide, manufactured by Honeycomb Systems Inc., Biddeford, Me.) using approximately 13.8 MPa water pressure, with multiple passes at a belt speed of 3.05 m/min, and a water jet strip having 15.75 holes/cm, with each hole having a diameter of 1.0 micron.

Test Procedures

Test Procedure I—Draw Ratio Measurement

The draw ratio of calendered and length oriented films were calculated by dividing the roll 4 (described above) output speed by the input speed of the cast web into rolls 1 and 2 (described above).

Test Procedure II—Density Measurement and Void Content Determination

Densities of cast films and films after calendering and orienting were measured at 23° C. in deionized water according to the method of ASTM D792-86. Each film sample was weighed on a Mettler AG245 high precision balance (Mettler-Toledo, Inc., Highstown, N.J.) and placed underwater. The mass of the water displaced was measured using the density measurement fixture. The volume of water displaced by the sample was thereby determined and, in combination with the sample weight, used to calculate the sample density. The void content was then calculated as follows:

Calculated Void content={1–(final density/initial density)}×100 where the initial density is the density of the cast film before orientation, and the final density is the density of the oriented film.

EXAMPLES

Example 1

An "A-B-C" 3-layer cast film was prepared according to Process I using polypropylene homopolymer (Fina 3271, available from Atofina Inc., Houston, Tex.) for the A-layer melt stream, a tri-block copolymer with polystyrene end blocks and a rubbery poly(ethylene-butylene) mid block (Kraton G1657, available from Kraton Polymers, Houston Tex.) for the B-layer melt stream, and a polypropylene homopolymer (Fina 3271, available from Atofina Inc., Houston, Tex.) for the C-layer melt stream. The resulting 3-layer cast film had a thickness of 940 micrometer, a width of 241 mm, and a density of 0.9 gram/cm$^3$.

The resulting cast film was calendered and length oriented according to Process II. The cast film was fed from an unwind station into the compressive nip of rolls 1 and 2 at a rate of 0.23 n/min. Rolls 1 and 2 each had surface speed of 0.91 m/min, a temperature of 120° C., and a gap between the rolls of 0.18 mm. Roll 3 had a surface speed of 2.97 m/min and a temperature of 120° C. Roll 4 had a surface speed of 3.27 m/min and a temperature of 145° C. The film was oriented to a draw ratio of 14.5:1 as determined by Test Procedure I. The resulting oriented film had a thickness of 100 micrometers, a width of 169.9 mm, and a density of 0.93 gram/cm$^3$. Although the film appeared white and hence voided; the film was calculated to contain 0% voids.

Finally the oriented film was microfibrillated on both sides as described in Process III, by passing the film through the hydroentangler 6 times on each side. This resulted in a film with an elastomeric core layer and two microfibrillated surfaces. The properties of this film made it useful as a waterproof cloth-like film.

Example 2

An "A-B-C" 3-layer cast film was prepared according to Process I using polypropylene homopolymer (Fina 3271, available from Atofina Inc., Houston, Tex.) for the A-layer melt stream, a blend of 80% polypropylene homopolymer (Fina 3271, available from ATOFINA Inc., Houston, Tex.) and 20% of an ethylene vinyl acetate copolymer (Elvax 670, available from DuPont Chemical Co., Wilmington, Del.) for the B-layer melt stream, and a polypropylene homopolymer (Fina 3271, available from Atofina Inc., Houston, Tex.) for the C-layer melt stream. The resulting cast film had a thickness of 880 micrometer, a width of 240 mm, and a density of 0.91 grams/cm$^3$.

The resulting 3-layer cast film was calendered and length oriented according to Process II. The cast film was fed from an unwind station into the compressive nip of rolls 1 and 2 at a rate of 0.32 m/min. Rolls 1 and 2 each had surface speed of 0.91 m/min, a temperature of 100° C., and a gap between the rolls of 0.18 mm. Roll 3 had a surface speed of 4.11 m/min and a temperature of 145° C. Roll 4 had a surface speed of 6.79 m/min and a temperature of 145° C. The film was oriented to a draw ratio of 21.4:1. The oriented film had a thickness of 121 micrometers, a width of 127 mm, and a density of 0.82 gram/cm$^3$. The film was calculated to contain 10% voids.

The oriented film was microfibrillated on both sides as described in Process III, by passing the film through the hydroentangler 4 times on each side. The preparation of the resulting microfibrillated 3-layer film showed that the use of polypropylene protective A and C layers assisted in the orienting process and resulted in a film that was oriented to an extension ratio of 21.4:1, contained 10% by volume of voids, and was able to be fibrillated completely through the oriented film, without leaving an inner layer of film.

Example 3

An "A-B-C" 3-layer cast film was prepared according to Process I using a blend of 80% polypropylene homopolymer (Fina 3271, available from Atofina Inc., Houston, Tex.) and 20% of an ethylene vinyl acetate copolymer (Elvax 670, available from DuPont Chemical Co., Wilmington, Del.) for the A-layer melt stream, polypropylene homopolymer (Fina 3271, available from Atofina Inc., Houston, Tex.) for the B-layer melt stream, and a blend of 80% polypropylene homopolymer (Fina 3271, available from Atofina Inc., Houston, Tex.) and 20% of an ethylene vinyl acetate copolymer (Elvax 670, available from DuPont Chemical Co., Wilmington, Del.) for the C-layer melt stream. The resulting 3-layer cast film had a thickness of 920 micrometer, a width of 243 mm, and a density of 0.91 grams/cm$^3$.

The resulting 3-layer cast film was calendered and length oriented according to Process II. The cast film was fed from an unwind station into the compressive nip of rolls 1 and 2 at a rate of 0.31 m/min. Rolls 1 and 2 each had a surface speed of 0.91 m/min, a temperature of 100° C., and a gap between the rolls of 0.18 mm. Roll 3 had a surface speed of 4.11 m/min and a temperature of 145° C. Roll 4 had a surface speed of 4.94 m/min and a temperature of 145° C. The film was oriented to a draw ratio of 15.9:1. The oriented film had a thickness of 98 micrometers, a width of 165 mm, and a density of 0.87 gram/cm$^3$. The film was calculated to contain 4% voids.

The oriented film was microfibrillated on both sides as described in Process III by passing the film through the hydroentangler 4 times on each side. The resulting 3-layer film, although microfibrillated on both surfaces, still contained a core layer of film. The film was oriented to an extension ratio of 15.9:1, contained 4% by volume of voids, and was not fibrillated completely through the film, leaving an inner layer of intact film. This shows that the use of polypropylene protective layers A and C in Example 2 assisted in increasing the extent of orientation, resulting in a film that was easier to microfibrillate than this 3-layer film of Example 3.

Example 4

An "A-B" 2-layer cast film was prepared according to Process I using a blend of 80% polypropylene homopolymer (Fina 3271, available from Atofina Inc., Houston, Tex.) and 20% of an ethylene vinyl acetate copolymer (Elvax 670, available from DuPont Chemical Co., Wilmington, Del.) for both the A- and B-layer melt streams. The cast film had a thickness of 924 micrometer, a width of 241 mm, and a density of 0.91 grams/cm$^3$.

The resulting cast film was calendered and length oriented according to Process II. The cast film was fed from an unwind station into the compressive nip of rolls 1 and 2 at a rate of 0.27 m/min. Rolls 1 and 2 each had surface speed of 0.91 m/min, a temperature of 100° C., and a gap between the rolls of 0.18 mm. Roll 3 had a surface speed of 3.66 m/min and a temperature of 145° C. Roll 4 had a surface speed of 5.49 m/min and a temperature of 145° C. The film was oriented to a draw ratio of 20.1:1. The oriented film had a thickness of 77 micrometers, a width of 152 mm, and a density of 0.91 gram/cm$^3$. The resulting oriented 2-layer film was clear and was calculated to contain 0% voids.

The oriented 2 layer film was subjected to conditions for microfibrillation on both sides as described in Process III, by passing the film through the hydroentangler 4 times on each side. The resulting film, although microfibrillated on both surfaces, still contained internal portions of intact film. In comparison with the microfibrillated 3-layer film of Example 2, Example 4 resulted in a film that was oriented to an extension ratio of 20.1:1, contained 0% by volume of voids, and was not microfibrillated completely through, leaving an inner portion of intact film. This further shows that the use of polypropylene protective layers in Example 2 assisted in increasing the extent of orientation, resulting in a more voided film and hence a more thoroughly microfibrillated film than this 2-layer film of Example 4.

Example 5

An "A-B-C" 3-layer cast film was prepared according to Process I using a blend of 80% by weight polypropylene homopolymer (Fina 3271, available from ATOFina Inc., Houston, Tex.) and 20% by weight of an ethylene vinyl acetate copolymer (Elvax 670, available from DuPont Chemical Co., Wilmington, Del.) for the A-layer melt stream, a low density polyethylene (Eastman LDPE 1550P, available from Eastman Chemical Co., Kingsport, Tenn.) for the B-layer melt stream, and a blend of 80% by weight polypropylene homopolymer (Fina 3271, available from ATOFina Inc., Houston, Tex.) and 20% by weight of an ethylene vinyl acetate copolymer (Elvax 670, available from DuPont Chemical Co., Wilmington, Del.) for the C-layer melt stream. The resulting 3-layer cast film had a thickness of 926 micrometers, a width of 241 mm, and a density of 0.92 grams/cm$^3$.

The resulting cast film was calendered and length oriented according to Process II. The cast film was fed from an unwind station into the compressive nip of rolls 1 and 2 at a rate of 0.31 m/min. Rolls 1 and 2 each had a surface speed of 0.91 m/min, a temperature of 100° C., and a gap between the rolls of 0.18 mm. Roll 3 had a surface speed of 4.11 m/min and a temperature of 145° C. Roll 4 had a surface speed of 5.35 m/min and a temperature of 145° C. The film was oriented to a draw ratio of 17.2:1. The resulting oriented 3-layer film had a thickness of 144 micrometers, a width of 162 mm, and a density of 0.84 gram/cm$^3$. The film was calculated to contain 8.7% voids.

The oriented 3-layer film was microfibrillated on both sides as described in Procedure III by passing the film through the hydroentangler 12 times on each side. This resulted in a film with a solid waterproof core layer and two microfibrillated surfaces.

Example 6

An "A-B-C" 3-layer cast film was prepared according to Process I using a polypropylene homopolymer (Fina 3271, available from Atofina Inc., Houston, Tex.) for the A-layer melt stream, a tri-block copolymer with polystyrene end blocks and a rubbery poly(ethylene-butylene) mid block (Kraton G1657, available from Kraton Polymers, Houston Tex.) for the B-layer melt stream, and a polyethylene elastomer (Affinity 1845, available from Dow Plastics, Midland, Mich.) for the C-layer melt stream. The resulting 3-layer cast film had a thickness of 880 micrometer, a width of 241 mm, and a density of 0.88 gram/cm$^3$.

The resulting cast film was calendered and length oriented according to Process II. The cast film was fed from an unwind station into the compressive nip of rolls 1 and 2 at a rate of 0.34 m/min. Rolls 1 and 2 each had surface speed of 0.61 m/min, a temperature of 80° C., and a gap between the rolls of 0.18 mm. Roll 3 had a surface speed of 2.44 m/min and a temperature of 145° C. Roll 4 had a surface speed of 3.55 m/min and a temperature of 145° C. The film was oriented to a draw ratio of 10.3:1. The resulting oriented 3-layer film had a thickness of 151 micrometers, a width of 160 mm, and a density of 0.9 gram/cm$^3$. This film was clear and was calculated to contain 0% voids.

Only the "A" side of the oriented 3-layer film was subjected to conditions for microfibrillation as described in Process III by passing the film through the hydroentangler 12 times. This resulted in a 3-layer puncture resistant film with one microfibrillated surface.

Example 7

An "A-B" 2-layer cast film was prepared according to Process I using a polypropylene homopolymer (Fina 3271, available from Atofina Inc., Houston, Tex.) for the A-layer melt stream, and a blend containing polypropylene homopolymers (22.5 weight % Fina 3445 with a melt flow index of 35 and 73.5 weight % Fina 3181 with a melt flow index of 0.75, both available from Atofina Inc., Houston Tex.), 1.3 weight % sorbitan monolaurate (SPAN 20 available from Uniqema, New Castle, Del.), and 2.7 weight % glycerol monolaurate (Lauricidin available from Med-Chem Labs, Inc., Galena, Ill.) for the B-layer melt stream. The resulting two-layer cast film had a thickness of 876 micrometer, a width of 237 mm, and a density of 0.91 gram/cm$^3$.

The resulting 2-layer cast film was calendered and length oriented according to Process II. The cast film was fed from an unwind station into the compressive nip of rolls 1 and 2 at a rate of 0.3 m/min. Roll 1 had surface speed of 0.91 m/min, a temperature of 120° C. Roll 2 had surface speed of 1.6 m/min and a temperature of 120° C. The gap between rolls 1 and 2 was set to 0.2 mm. Rolls 3 and 4 each had a surface speed of 4.8 m/min and a temperature of 145° C. The film was oriented to a draw ratio of 15.8:1. The resulting oriented 2-layer film had a thickness of 93 micrometers, a width of 249 mm, and a density of 0.90 g/cm$^3$. Although the film appeared white and hence voided; the film was calculated to contain only 0.2% voids.

The oriented 2-layer film was microfibrillated on both sides as described in Process III by passing the film through the hydroentangler 6 times on each side. The resulting 3-layer film, although microfibrillated on both surfaces, was not fibrillated completely through the film, leaving an inner portion of intact film in the core. This resulted in a microfibrillated film or non-woven cloth that was hydrophilic on one side and hydrophobic and oleophilic on the other side.

Example 8

An "A-B-C" 3-layer cast film was prepared according to Process I using a polypropylene homopolymer (Fina 3271, available from Atofina Inc., Houston, Tex.) for the A-layer melt stream, a blend containing polypropylene homopolymers (22.5 weight % Fina 3445 with a melt flow index of 35 and 73.5 weight % Fina 3181 with a melt flow index of 0.75, available from Atofina Inc., Houston, Tex.), 1.3 weight % sorbitan monolaurate (SPAN 20 available from Uniqema, New Castle, Del.), and 2.7 weight % glycerol monolaurate (Lauricidin available from Med-Chem Labs, Inc., Galena, Ill.) for the B-layer melt stream, and a polypropylene homopolymer (Fina 3271, available from Atofina Inc., Houston, Tex.) for the C-layer melt stream. The resulting 3-layer cast film had a thickness of 878 micrometers, a width of 238 mm, and a density of 0.9 gram/cm$^3$.

The resulting cast film was calendered and length oriented according to Process II. The cast film was fed from an unwind station into the compressive nip of rolls 1 and 2 at a rate of 0.33 m/min. Rolls 1 and 2 each had a surface speed of 0.91 m/min and a temperature of 120° C. The gap between rolls 1 and 2 was set to 0.18 mm. Roll 3 had a surface speed of 4.57 m/min and a temperature of 145° C. Roll 4 had a surface speed of 6.17 m/min and a temperature of 145° C. The film was oriented to a draw ratio of 18.5:1. The oriented film had a thickness of 100 micrometers, a width of 152 mm, and a density of 0.80 gram/cm$^3$. The film was calculated to contain 11% voids.

The oriented film was microfibrillated on both sides as described in Process III by passing the film through the hydroentangler 6 times on each side. The preparation of the resulting microfibrillated 3-layer film showed that the use of polypropylene protective A and C layers assisted in the orienting process and resulted in a film that was oriented to an extension ratio of 18.5:1, contained 11% by volume of voids, and was able to be microfibrillated completely through the oriented film, without leaving an inner portion of un-fibrillated film. Compared with the microfibrillated film of Example 7, this microfibrillated 3-layer film of Example 8 had an increased extent of orientation, an increased void volume per cent, and was more thoroughly microfibrillated. Similar to microfibrillated film of Example 7, this construction was also a non-woven cloth-like film with both hydrophilic and oleophilic surface properties.

Example 9

An "A-B-C" 3-layer cast film was prepared according to Process I using a polypropylene homopolymer (Fina 3271, available from Atofina Inc., Houston, Tex.) for the A-layer melt stream, a fluoropolymer (THV 220, available from Dyneon LLC, Oakdale, Minn.) for the B-layer melt stream, and a polypropylene homopolymer (Fina 3271, available from Atofina Inc., Houston, Tex.) for the C-layer melt stream. The resulting cast film had a thickness of 831 micrometer, a width of 222 mm, and a density of 1.1 grams/cm$^3$.

The resulting 3-layer cast film was calendered and length oriented according to Process II. The cast film was fed from an unwind station into the compressive nip of rolls 1 and 2 at a rate of 0.48 m/min. Rolls 1 and 2 each had a surface speed of 0.91 m/min, a temperature of 80° C., and a gap between the rolls of 0.18 mm. Roll 3 had a surface speed of 4.57 m/min and a temperature of 120° C. Roll 4 had a surface speed of 4.65 m/min and a temperature of 145° C. The film was oriented to a draw ratio of 10.8:1. The resulting oriented 3-layer film had a thickness of 186 micrometers, a width of 143 mm, and a density of 0.86 gram/cm$^3$. The film appeared white and hence voided; although there was some delamination between the layers.

The oriented 3-layer film was microfibrillated on both sides as described in Process III by passing the film through the hydroentangler 6 times on each side. This resulted in a film with a fluoropolymer core layer and two microfibrillated surfaces.

Example 10

An "A-B-C" 3-layer film was cast and oriented as in Example 8. A poly(vinylchloride) tape was applied to the top "A" layer to mask the film, leaving only one square region of the surface exposed. The masked film was microfibrillated on the masked "A" side through the "A" layer and into the underlying "B" layer as described in Process III, by passing the film through the hydroentangler 4 times, exposing only the unmasked portion of the "A" layer to the water jets. The masking tape was then removed from the "A" top layer. The result was a selectively microfibrillated, chemically differentiated sheet having a square region which contained microfibers of both the "A" and "B" layers surrounded by the unfibrillated region (masked area) of the top "A" layer. The microfibrillated region possessed a hydrophilic quality due to the presence of the fibers which originated from the underlying "B" layer, while the surrounding region was hydrophobic, because it was composed solely of the unfibrillated "A" top layer of polypropylene. These results show that a multi-layer film, having a selected microfibrous area of one property adjacent an unfibrillated area of another property.

Example 11

An "A-B-C" 3-layer film was cast and oriented as in Example 8. The oriented film was microfibrillated only partially through the top "A" layer as described in Process III, by passing the film through the hydroentangler one time, exposing only the "A" layer of the 3-layer film to the water jets. Then an aluminum plate having several circular holes was placed over the resulting top "A" layer to mask the film, leaving several circular regions of the film surface exposed. The masked film was then microfibrillated on the masked side as described in Process III, by passing the film through the hydroentangler three more times, exposing only the unmasked circular regions of the film to the water jets. The resulting construction had a chemically differentiated, selectively patterned fibrous surface having circular regions containing fibers of both the "A" layer and the "B" layer. These regions possessed a hydrophilic character and were surrounded by regions containing only fibers of the "A" layer which were hydrophobic in nature. These results show that a multilayer film, having selected microfibrous areas of one property adjacent a microfibrillated area of another property, was formed.

What is claimed is:

1. A co-extruded, uni-axially oriented multi-layer film comprising a co-extruded uni-axially oriented microfiber layer, wherein the film comprises two opposing surfaces, each surface comprising microfibers having average effective diameters of less than 20 microns and transverse aspect ratios of from 1.5:1 to 20:1, wherein one surface is hydrophilic and one surface is hydrophobic.

2. The film of claim 1 wherein the film is uni-axially oriented by stretching in one direction relatively more than stretching in a perpendicular direction.

3. The film of claim 1 comprising a microfiber layer and a non-microfiber layer,
the microfiber layer comprising a material that exhibits a property selected from the group consisting of hydrophobicity, hydrophilicity, oleophobicity, oleophilicity, a dielectric property, low coefficient of friction, stain resistance, flame retardance, high strength or modulus, an ability to produce a certain size microfiber, and combinations thereof, and
the non-microfiber layer comprising a material selected from the group consisting of a hydrophobic material, a hydrophilic material, an elastomeric material, a tear resistant material, a puncture resistant material, a high or low temperature resistant material, high strength, high modulus, adhesive properties, and a flame retardant material.

4. The film of claim 3 wherein the microfiber layer comprises a polypropylene.

5. The film of claim 3 wherein the non-microfiber layer comprises an elastomeric polymer.

6. The film of claim 1 wherein the multi-layer film is selected from the group consisting of a film consisting of two layers and a film consisting of three layers.

7. The film of claim 1 wherein the film comprises a non-microfiber layer comprising a material selected from the group consisting of a polypropylene, a polyethylene, a styrene-ethylene/butylene-styrene block copolymer, a styrene-isoprene-styrene block copolymer, a polyurethane, a fluoropolymer, poly(butylene), poly(isoprene), a nylon, and an adhesive.

8. The film of claim 1 wherein the film comprises two microfiber layers sandwiching a non-microfiber layer.

9. The film claim 8 wherein the non-microfiber layer is elastomeric.

10. The film of claim 8 wherein the non-microfiber layer comprises a material selected from the group consisting of a polypropylene, a polyethylene, a styrene-ethylene/butylene-styrene block copolymer, a styrene-isoprene-styrene block copolymer, a polyurethane, a fluoropolymer, poly(butylene), poly(isoprene), a nylon, and an adhesive.

11. The film of claim 8 wherein a microfiber layer is a semicrystalline polymer selected from the group consisting of high and low density polyethylene, polypropylene, polyoxymethylene, poly(vinylidine fluoride), poly(methyl pentene), poly(ethylene-chlorotrifluoroethylene), poly(vinyl fluoride), poly(ethylene oxide), poly(ethylene terephthalate), polyethylene naphthalate, poly(butylene terephthalate), poly(lactic acid), nylon 612, nylon 6, nylon 66, polybutene, a thermotropic liquid crystal polymer, a blend of one or more of these polymers, or a copolymer of one or more the named monomers.

12. The film of claim 1 wherein the film comprises from about 2 to about 5 layers.

13. The film of claim 1 wherein the film comprises from about 2 to about 5 layers, and the total film thickness prior to fibrillation is in the range from about 25 to about 10,160 microns.

14. The film of claim 1 consisting of two microfiber layers and a non-microfiber layer.

15. The film of claim 1 consisting of 2 microfiber layers.

16. The film of claim 1 consisting of 3 layers; one non-microfiber layer sandwiched by two microfiber layers.

17. The film of claim 1 wherein the microfibers have an average effective diameter of less than 5 microns.

18. The film of claim 1 wherein the microfibers have an average cross-sectional area of $0.7 \mu^2$ to $2.1 \mu^2$.

19. A co-extruded, uni-axially oriented, multi-layer film comprising a non-microfiber layer sandwiched between two microfiber-forming layers, wherein one microfiber layer can be microfibrillated to a hydrophilic surface, and one microfiber layer can be microfibrillated to a hydrophobic surface.

20. A multi-layer microfiber article comprising a first microfiber layer at a surface of the article, and second microfiber layer adjacent to the first microfiber-layer, wherein areas of the surface are microfibrillated to form microfibers of only the first layer, and areas of the surface are microfibrillated through the first layer to form microfibers of the second layer.

21. The multi-layer microfiber article of claim 20 wherein a surface of the article includes a pattern comprising a first area of microfibers of one layer of the article, and a second area of microfibers of the second layer.

22. The article of claim 21 wherein an area of microfibers has a property selected from the group consisting of hydrophobicity, hydrophilicity, oleophilicity, and oleophobicity.

23. A multi-layer film comprising two microfiber layers, wherein one microfiber layer is hydrophilic and one microfiber layer is hydrophobic.

24. The multi-layer film of claim 23 comprising two microfiber layers sandwiching a non-microfiber layer.

25. The film of claim 24 wherein the non-microfiber layer is elastomeric.

26. The film of claim 24 consisting of three layers.

27. The film of claim 24 consisting of three coextruded layers.

28. A co-extruded, uni-axially oriented multi-layer film comprising a co-extruded uni-axially oriented microfiber layer, wherein the film comprises two opposing surfaces, wherein one surface is hydrophilic and one surface is hydrophobic, and wherein each surface comprises microfibers having average effective diameters of less than 5 microns.

29. A co-extruded, uni-axially oriented multi-layer film comprising a co-extruded uni-axially oriented microfiber layer, wherein the film comprises two opposing surfaces, wherein one surface is hydrophilic and one surface is hydrophobic, and wherein each surface comprises microfibers having average cross-sectional areas of $0.7 \mu^2$ to $2.1 \mu^2$.

30. A multi-layer film comprising two microfiber layers, wherein one microfiber layer is hydrophilic and one microfiber layer is hydrophobic, and wherein each microfiber layer comprises microfibers having average effective diameters of less than 5 microns.

31. A multi-layer film comprising two microfiber layers, wherein one microfiber layer is hydrophilic and one microfiber layer is hydrophobic, and wherein each microfiber layer comprises microfibers having average cross-sectional areas of $0.7 \mu^2$ to $2.1 \mu^2$.

* * * * *

UNITED STATES PATENT AND TRADEMARK OFFICE
CERTIFICATE OF CORRECTION

PATENT NO. : 6,977,113 B2  
APPLICATION NO. : 09/974040  
DATED : December 20, 2005  
INVENTOR(S) : Robert S. Kody et al.

Page 1 of 1

It is certified that error appears in the above-identified patent and that said Letters Patent is hereby corrected as shown below:

Col. 4  
Line 59, after "herein" insert -- by --.

Col. 11  
Line 9, delete "heroin" and insert -- herein --, therefor.

Col. 19  
Line 37, delete "n/min" and insert -- m/min --, therefor.

Col. 21  
Line 20, delete "2 layer" and insert -- 2-layer--, therefor.

Col. 25  
Line 40, in Claim 9, after "film" insert -- of --.  
Line 57, in Claim 11, delete "or" and insert -- and --, therefor.

Col. 26  
Lines 12-13, in Claim 19, after "layer" delete "can be".  
Line 14, in Claim 19, after "layer" delete "can be".

Signed and Sealed this

Twentieth Day of November, 2007

JON W. DUDAS  
*Director of the United States Patent and Trademark Office*